United States Patent [19]

Spillman, Jr.

[11] Patent Number: 4,777,661
[45] Date of Patent: Oct. 11, 1988

[54] APPARATUS AND METHOD FOR SELF-REFERENCING AND MULTIPLEXING INTENSITY MODULATING FIBER OPTIC SENSORS

[75] Inventor: William B. Spillman, Jr., Charlotte, Vt.

[73] Assignee: Simmonds Precision Products, Inc., Tarrytown, N.Y.

[21] Appl. No.: 909,853

[22] Filed: Sep. 22, 1986

[51] Int. Cl.$^4$ .................... H04B 9/00; H04J 1/16; H04J 3/14
[52] U.S. Cl. .................... 455/605; 455/608; 455/610; 370/3; 370/4
[58] Field of Search .............. 455/605, 608, 610, 612; 370/3, 4; 324/96; 250/227; 350/96.16

[56] References Cited

U.S. PATENT DOCUMENTS

| | | | |
|---|---|---|---|
| 4,089,584 | 5/1978 | Polczynski | 350/96.16 |
| 4,136,929 | 1/1979 | Suzaki | 350/96.16 |
| 4,161,651 | 7/1979 | Sano | 455/612 |
| 4,244,045 | 1/1981 | Nosu | 370/3 |
| 4,302,835 | 11/1981 | McMahon | 370/4 |
| 4,375,680 | 3/1983 | Cahill | 367/149 |
| 4,443,700 | 4/1984 | Macedo et al. | 250/227 |
| 4,473,270 | 9/1984 | Shaw | 350/96.15 |
| 4,479,701 | 10/1984 | Newton | 350/96.16 |
| 4,514,860 | 4/1985 | Adolfsson et al. | 455/612 |
| 4,517,456 | 5/1985 | Halsall et al. | 455/610 |
| 4,545,253 | 10/1985 | Avicola | 250/227 |
| 4,699,513 | 10/1987 | Brooks et al. | 250/227 |

OTHER PUBLICATIONS

IEEE Spectrum–"Optical Fiber Sensors Challenge the Competition", 9/86, pp. 44–49–Giallorenzi et al.
Self–Referencing Multiplexing Technique for Intensity Modulating Fiber Optic Sensors–presented to SPIE Fiber Optic Conference 9/23/86–Spillman et al.

Primary Examiner—Robert L. Griffin
Assistant Examiner—Andrew Telesz, Jr.
Attorney, Agent, or Firm—Cushman, Darby & Cushman

[57] ABSTRACT

Apparatus and method for self-referencing and multiplexing light intensity modulating fiber optic sensors provides a pulsed or chirped source light beam. The light beam is propagated through an input fiber optic cable into at least a first loop path. In the first loop path, the source light beam is modulated in accordance with a detected phenomenon to provide a modulated light beam. In the first loop path, a coupler splits-off (a) a portion of the source light beam, and (b) a portion of the modulated light beam. The split off portions are directed through an output fiber optic cable to a photo detector which thus receives a pulse train having a modulated pulse and an unmodulated pulse. The output of the photo detector is supplied to a processor which forms a ratio of the modulated and unmodulated pulses and provides an output signal which varies in accordance with the detected phenomenon but is relatively insensitive to optical transmission losses and optical source drift. A plurality of loop paths may be coupled in parallel between the input and output fiber optic cables. In the multiple loop system, the photo detector receives a pulse train for each loop path-transducer sensor. Thus, the processor may provide a plurality of output signals, each corresponding to the phenomenon detected by the associated transducer, but without the adverse effects of transmission loss or optical source drift.

21 Claims, 4 Drawing Sheets

APPARATUS AND METHOD FOR SELF-REFERENCING AND MULTIPLEXING INTENSITY MODULATING FIBER OPTIC SENSORS

BACKGROUND OF THE INVENTION

This invention relates to apparatus and method whereby light intensity modulating fiber optic sensors may be self-referenced to reduce variable losses due to the optical leads, connectors, and other optical components. Thus, the output signal from such apparatus will vary only with the detected phenomenon and not transmission losses. This invention also relates to a self-referencing system in which a multiplexing technique is used to provide clear output signals from a plurality of fiber optic sensors coupled in one system.

The explosion in fiber optic technology is transforming many areas of technical endeavor. For example, the telecommunications industry is undergoing an infusion of fiber optic devices and expertise. The intensive research and development efforts directed to fiber optic technology have produced a wide array of potential applications for fiber optic devices. Paramount among these potential uses is fiber optic sensing.

Over the past few years, fiber optic sensing systems have been proposed for a wide variety of uses such as temperature sensing, pressure sensing, acceleration measurement, measurement of the flow of liquids and gases, strain sensing, the measurement of a liquid level in a container, etc. The rapid increase in optical fiber sensors is attributable to their marked advantages over known sensing systems. For example, it is known that optical fiber sensors are more rugged and more resistant to corrosion than other sensors. Also, fiber optic sensors are relatively immune to electromagnetic interference. In addition, fiber optic sensing systems appear to be more sensitive, less expensive and more reliable than known sensing devices. The current state of optical fiber sensors is described in the article "Optical-Fiber Sensors Challenge The Competition", by Giallorenzi et al, appearing in IEEE Spectrum, September 1986.

However, the wide-spread use of such optical sensors has been somewhat inhibited due to the signal-to-noise ratio problems inherent in such systems. Specifically, transmission losses such as optical lead losses, connector losses, and other optical component losses may actually exceed the useable signal provided at the output of the system. For example, an optical pressure transducer may provide an output signal which is within the noise level of the optical system. Therefore, until an appropriate solution is found for overcoming such transmission losses, the use of fiber optic sensing systems may be somewhat delayed.

An additional problem with known fiber optic sensors is that the drift in the light source may also overshadow the optical transducer output. This problem is described briefly in the IEEE Article discussed above. Thus, successful fiber optic sensing technology requires a solution to the problems of transmission losses and optical source drift.

SUMMARY OF THE INVENTION

The present invention provides apparatus and method for greatly reducing the effects of transmission losses and optical source drift in fiber optic sensing systems. In addition, the present invention provides such advantages in a multi-transducer system.

According to the present invention, apparatus and method for self-referencing an intensity modulating fiber optic sensor includes an optical source, at least one recirculating optical fiber loop connected between parallel transmission optical fibers, an optical transducer coupled to the recirculating loop, first and second optical couplers coupling the optical loop to the parallel transmission fiber optic cables, a photo detector for detecting the output signals, and a processor for processing the photo detector output and providing an output signal corresponding to the phenomenon detected by the optical transducer.

In a first embodiment, the optical source provides a pulsed source light beam. The light beam is directed along a first transmission fiber optic cable. A coupler splits off a portion of the source light beam and directs it into the optical fiber loop. After transiting one half of the fiber optical loop, a second portion of the source light beam is split off with a second coupler. This second portion is directed along the second transmission cable to the photo detector. This second portion is the reference. The portion of the source light beam which remains in the optical fiber loop is then directed to the optical transducer. The optical transducer modulates this portion of the source light beam in accordance with an externally applied condition. The modulated portion of the light beam is then directed back to the first coupler which recirculates it in the optical fiber loop. The modulated portion of the source light beam then encounters the second coupler which splits off a portion of it to the second transmission cable. This second (modulated) portion is then directed to the photo detector which detects the intensity thereof.

Since the reference portion of the source light beam is subjected to all transmission losses and optical source drift, the light intensity thereof is a function of such transmission losses and optical source drift. The modulated portion of the source light beam is also subjected to such transmission losses and optical source drift. However, the modulated pulse is also subjected to intensity modulation in the optical transducer. Therefore, by forming a ratio of the reference pulse and the modulated pulse, transmission losses and optical source drift will cancel out leaving the output signal as only a function of the intensity modulation of the optical transducer. Such an output signal will vary strictly in accordance with the detected phenomenon without losses attributable to transmission attenuation and optical source drift. Since the reference pulse and the modulated pulse are derived from the same source pulse, the output signal is self-referenced.

The method and structure according to the present invention also provides unique advantages when applied to an optical sensing system having a plurality of optical transducers coupled in a plurality of recirculating optical loops. Each recirculating optical loop operates in accordance with the manner described above. Thus, the photo detector receives a pulse train of reference and modulated pulses. By time demultiplexing this pulse train, output signals can be provided for each of the three optical transducers. As above, each output signal varies only in accordance with the detected phenomenon without transmission losses and the adverse effects of optical source drift.

According to a second embodiment of the present invention, a frequency multiplexing technique can also be realized. According to this embodiment, the optical source provides a frequency modulated (chirped) signal. Each pulse (chirp) is modulated to have a varying frequency. A chirped local oscillator is coupled to the optical source to provide the chirped source light beam. The chirped light beam is then introduced into a multi-transducer system, as described above. The reference and modulated pulses are again received by the photo detector. However, the output of the photo detector is coupled to a mixer which also receives the chirped local oscillator output. By beating together (heterodyning) the local oscillator signal with the received photo detector signal, a frequency multiplexed output signal is obtained. This signal includes a number of distinct frequency beat signals. The frequency beat signals are analogous to the time division signals according to the first embodiment, but are now in the frequency domain. Thus, the frequency multiplexed output signal contains both reference beat signals and modulated beat signals. Again, these signals are provided to a processor which demultiplexes them to provide an output signal corresponding to a ratio of the reference and the modulated signals. Thus, the output signal varies in accordance with the phenomena detected by the multiple optical transducers, without transmission losses or optical source drift.

BRIEF DESCRIPTION OF THE DRAWINGS

The structure, functions, and advantages according to the present invention will be more fully understood from studying the following detailed description of the presently preferred exemplary embodiment taken together with the attached drawings in which.

DETAILED DESCRIPTION OF THE PRESENTLY PREFERRED EXEMPLARY EMBODIMENT

The self-referencing multiplexing technique according to the present invention is based upon the use of sensor units that have light intensity modulating fiber optic transducers incorporated into recirculating optical loops. The sensor units are connected in parallel across a pair of transmit/receive optical fibers. The sensors are interrogated with high speed optical pulses or frequency chirps.

Figure 1:
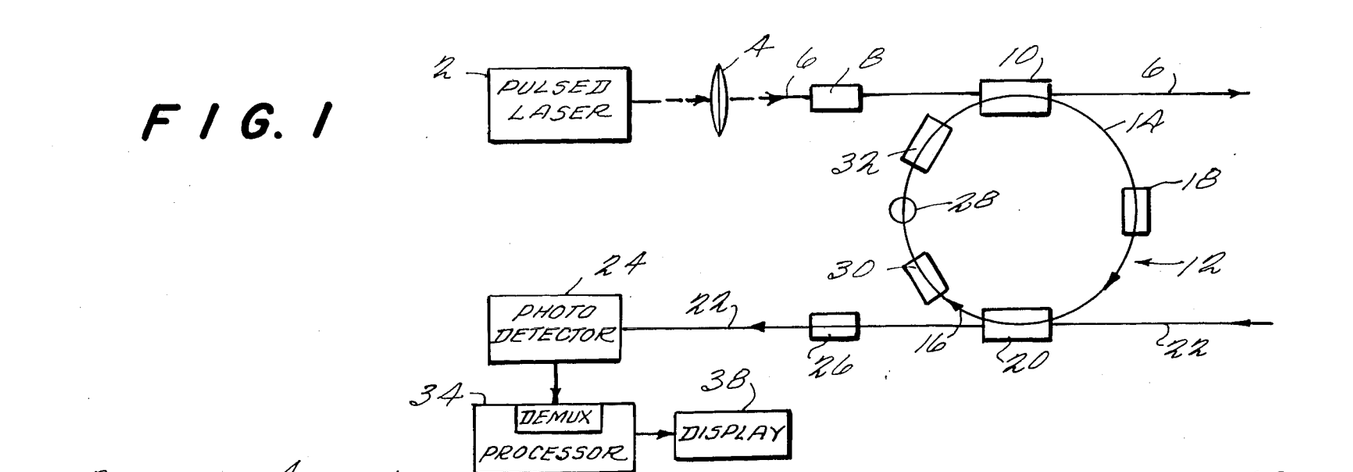
FIG. 1 is a schematic diagram of a single optical loop transducer device according to the time multiplexed embodiment according to the present invention.

Referring to FIG. 1, a schematic diagram of a single optical loop transducer device is shown. In this case, a pulse train of optical energy with a pulse peak power $I_o$ is provided from pulsed laser 2. This pulsed source light beam is coupled into transmission fiber optic cable 6 via objective lens 4. The optical transmission cable 6 may include a plurality of loss generating components, such as splice 8.

As each pulse travelling in transmission cable 6 enters optical coupler 10, a portionn thereof is split off and directed into optical loop 12. Optical loop 12 may include a forward path 14 and a return path 16. Optical loop 12 may include a plurality of optical components, for example, splice 18. As each pulse portion propagates through forward path 14, it enters a second optical coupler 20 where another portion thereof is split off and directed to transmission path 22. This other portion of the pulse is then directed to photo detector 24. Again, transmission line 22 may include loss generating components, such as splice 26.

The reference pulse is thus derived from the pulse which travels through transmission cable 6, first optical coupler 10, forward path 14, second optical coupler 20, and transmission line 22.

The portion of the optical pulse which is not split-off by second optical coupler 20 continues to circulate within optical loop 12. Thus, this portion of the optical pulse is directed to return path 16 where it is modulated by optical transducer 28. Optical transducer 28 may be any known or obvious optical transducer which modulates the intensity of the optical pulse in accordance with a detected phenomenon. Thus, any optical transducer may be used which responds to an externally applied condition, such as temperature, pressure, rate of rotation, liquid flow, acceleration, etc. In addition, other signal attenuating components may be coupled into return path 16. For example, many optical transducers require the use of splices 30 and 32 to couple them into return path 16. At this point, it should be noted that it is possible for optical transducer 28 to be coupled into forward path 14 of optical loop 12. However, such a configuration provides a somewhat lower signal-to-noise ratio than is provided by coupling optical transducer 28 into return path 16 of optical loop 12.

The optical pulse whose intensity is modulated by optical transducer 28 then continues to propagate through return path 16, past first optical coupler 10, and is reintroduced into forward path 14. When this modulated pulse reaches second optical coupler 20, a portion thereof is again split off and directed to photo detector 24 through transmission line 22. Thus, photo detector 24 receives the reference pulse and the modulated pulse separated by a short time period. Photo detector 24 then provides a pulse train output signal to processor 34. Processor 34 then forms a ratio of the light intensities of the reference pulse and the modulated pulse. An output signal is then provided which corresponds to this ratio. This output signal will be relatively insensitive to the transmission losses of the system and the drift of optical source 2. A display 38 may be used to display the output signal.

In summary, a pulse of optical energy with a peak power $I_o$ is provided from pulsed laser 2. At optical coupler 10, a portion of the input optical power is coupled into recirculating optical loop 12. The remainder of the input power exits optical coupler 10 to be either transmitted to another unit or to be lost from the system. The light coupled into optical loop 12 travels to a second coupler 20 where a fraction of the optical energy exits the loop and is transmitted to photo detector 24. The remainder of the optical power in the loop is modulated by optical transducer 28, has a fraction of its signal coupled out by first optical coupler 10, and continues on to have an additional fraction of its optical power coupled out by optical coupler 20. The net result of the recirculating action of the loop is to transmit a pulse train to photo detector 24. The first pulse is proportional to the optical power coupled into the loop, the second pulse is proportional to the intensity modulation, the third pulse is proportional to the intensity modulation squared, and so on. The relative intensities of the pulses within a pulse train will then primarily depend upon the parameters of optical transducer 28 and will be relatively insensitive to transmission losses and optical source drift.

To more fully understand the principles according to the present invention, the pulse train provided to photo detector 24 will now be mathematically characterized. First, each of couplers 10 and 20 is assumed to have 9:1 splitting ratio implying that light entering the coupler on one side will divide so as to have 90% of the optical power remaining on that side and 10% of the optical power injected into the other side. Thus, at each optical coupler 10% of the optical power is split off.

Mathematically, the intensity of the first pulse reaching the photo detector 24 may be represented as a function of the initial intensity $I_o$ and the fractional transmission losses encountered enroute to the detector. For example, the following losses are generated according to the following components in FIG. 1: splice 8—$L_S$; optical coupler 10—$L_C$; splice 18—$L_S$; optical coupler 20—$L_C$; splice 30—$L_S$; optical transducer 28—$L_t$; splice 32—$L_S$; and splice 26—$L_S$. The light intensity actually transmitted through each of these components is equal to 1 (100% transmission) minus the loss incurred at that component. For example, the light intensity transmitted through a coupler $T_C$ is equal to 1—$L_C$. In a like manner, the light intensity transmitted through a given splice $T_S$ is equal to 1—$L_S$. Finally, the light intensity transmitted through the optical transducer $T_t$ is equal to 1—$L_t$.

The first light pulse propagating through transmission cable 6, splice 8, optical coupler 10, forward path 14, splice 18, optical coupler 20, transmission cable 22, splice 26, to photo detector 24 may be mathematically characterized as follows:

$$I_1 = I_o(T_S T_C(0.1) \, T_S T_C(0.1) T_S) \quad (1)$$
$$= I_o(0.01) T_S^3 T_C^2.$$

In a like manner, that portion of the first pulse which continues in the optical loop 12 through return path 16, splice 30, optical transducer 28, splice 32, first optical coupler 10, forward path 14, splice 18, second optical coupler 20, transmission path 22, splice 26, to photo detector 24 may be mathematically characterized as follows. It is assumed that the intensity modulation due to the detected phenomenon is equal to M.

$$I_2 = I_o(T_S T_C(0.1) T_S T_C(0.9) T_S M T_t T_S T_C(0.9) T_S T_C(0.1) T_S) \quad (2)$$
$$= I_o \, T_S^6 T_C^4 (0.0081) T_t M.$$

If a ratio of the light intensities of the first and second pulses received by photo detector 24 is calculated, the ratio will be as follows:

$$I_2/I_1 = [I_o T_S^6 T_C^4 (0.0081) \, T_t M]/[I_o T_S^3 T_C^2 (0.01)]. \quad (3)$$
$$= (0.81) T_S^3 T_C^2 T_t M.$$

As can be seen from equation (3), this ratio is independent of the peak optical power, $I_o$ coupled into the sensor unit. Thus, the output signal will be relatively insensitive to optical source drift and will provide a sensor output having both reference and data signal therein.

Figure 2:
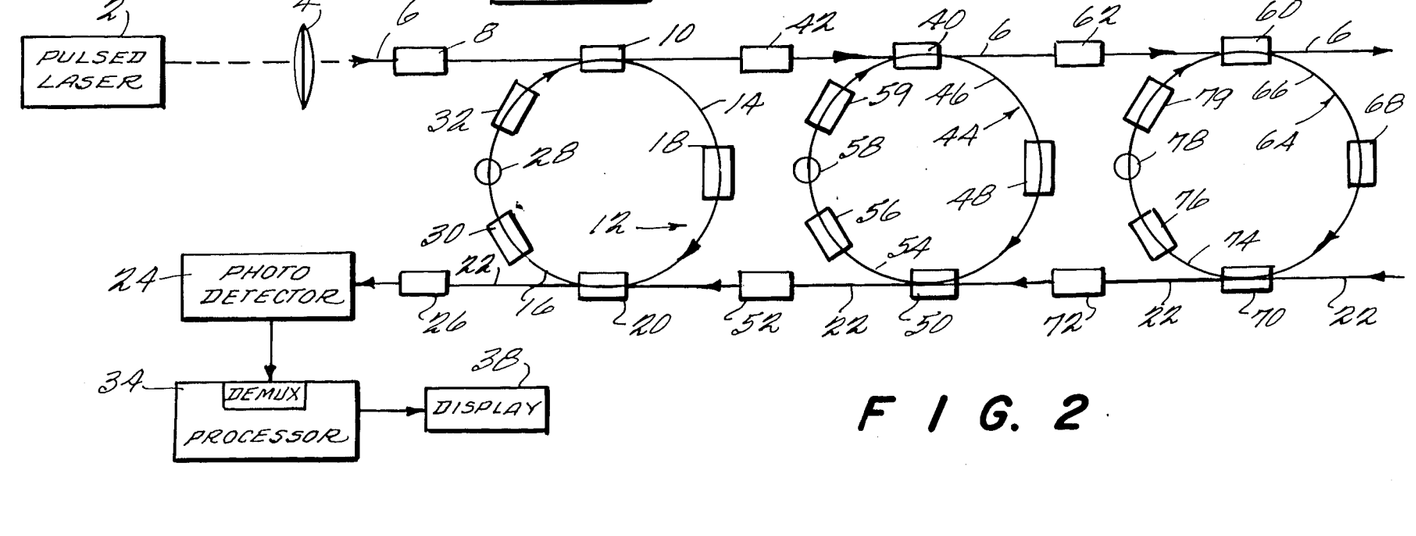
FIG. 2 is a schematic diagram of a three optical loop transducer system according to the time multiplexed embodiment of the present invention.

FIG. 2 depicts a three sensor system which operates in accordance with the manner described in FIG. 1. Thus, an optical pulse provided from pulsed laser 2 propagates through transmission cable 6 to optical couplers 10, 40 and 60. The portion of the optical pulse which is transmitted through optical coupler 10 passes through splice 42 into optical coupler 40. In optical coupler 40, 10% of the remaining pulse intensity is coupled into optical loop 44. This portion of the pulse is propagated through forward path 46, past splice 48, and into optical coupler 50. 10% of this pulse is then split off and propagated through transmission cable 22, splice 52, coupler 20, splice 26, and to photo detector 24. This pulse will be the reference pulse for the second optical sensor.

The portion of the pulse which is transmitted through optical coupler 50 is recirculated in optical loop 44 through return path 54. This portion of the pulse propagates through splice 56, is modulated in optical transducer 58, propagated through splice 59, and redirected back to optical coupler 40. Optical coupler 40 then directs the modulated pulse back through the forward path 46 to optical coupler 50. A portion of the modulated pulse is split off by optical coupler 50 and directed to photo detector 24 through splice 52, optical coupler 20, and splice 26. When this pulse reaches photo detector 24, its intensity is a function of the transmission losses as well as the phenomenon detected by optical transducer 58. Thus, photo detector 24 receives a first pulse train generated by the first optical loop 12, and second pulse train generated by the second optical loop 44.

In a like fashion, photo detector 24 receives a third pulse train from optical loop 64. This third pulse train includes a pulse which has propagated through transmission cable 6 to splice 62, optical coupler 60, forward path 66 of loop 64, splice 68, optical coupler 70, splice 72, and on to photo detector 24. The second pulse in the third pulse train corresponds to that portion of the pulse which is recirculated in optical loop 64 from coupler 70. This portion of the pulse is propagated through return path 74, through splice 76, modulated in optical transducer 78, propagated through splice 79, optical coupler 60, splice 68, optical coupler 70, splice 72, transmission line 22 and on to photo detector 24.

As can be appreciated, photo detector 24 receives three pulse trains each pulse train including a reference signal and a modulated signal. Processor 34 then demultiplexes the pulse trains to provide the appropriate output signals for each optical transducer 28, 58 and 78. A display 38 may be used to visually display the output signal.

Persons having skill in this field will understand that any number of optical transducers may be coupled in parallel between the two transmission lines. The only limitation on the number of optical transducers that can be coupled into such a system is the reduced intensity of the signal provided to the nth sensor. However, if average values are assumed for the component losses in such a system, then the pulse train for the nth sensor will have first and second peak intensities as follows:

$$I_1(n) = (0.9 T_C T_S)^{2n-2} (0.01 I_0 T_S^3 T_C^2) \quad (4)$$

$$I_2(n) = (0.9 T_C T_S)^{2n-2} (0.0081 I_0 T_S^6 T_C^4 T_t M_n). \quad (5)$$

Thus, the ratio of the second pulse to the first pulse in the nth pulse train is given by:

$$R(n) = (0.81 T_S^3 T_C^2 T_t) M_n. \quad (6)$$

As can be seen, this ratio is insensitive to losses outside of the nth sensor. The individual pulse trains then allow identification of the individual sensors via their separation in time, and the ratio of the pulses within each train provides a measure of the optical modulation for each sensor.

In order to verify the theoretical parameters of this system, an initial experiment was performed on a breadboard single sensor unit configured as depicted in FIG. 1. Light from a Hammamatsu laser pulser (wavelength=820 nanometers) having a pulse width of 135 picoseconds was coupled into the input leg of a 4:1 multimode coupler having a 0.6 dB excess loss. The second coupler in the loop had an excess loss of 2.4 dB and a 71:29 coupling ratio. The couplers were fabricated at Simmonds Precision Products from 100/140 micron step index fiber. All optical connectors within the sensor were made using TRW Opta-splices (Tm). The intensity modulating transducer used in the sensor was a simple displacement sensor consisting of two cleaved fiber ends disposed in close proximity. One end of the fiber was fixed while the other was attached to a differential micrometer stage to allow for transverse displacement between the fiber ends. The transverse displacement could be controlled to 0.5 microns with a resolution of 0.1 microns. The pulse trains were detected using an Antronics high speed PIN photodiode whose output was analyzed by a Tektronix high speed digital storage oscilloscope. The relative peak pulse intensities within the output pulse train were measured as a function of transverse displacement of the two fiber ends. The effects of varying the optical input to the sensor (intensity, mode volume, etc.) were also investigated.

The oscilloscope trace from the breadboard sensor loop module showed an intensity ratio of the second to first peaks of approximately 0.27. In the absence of any modulation and excess loss, and assuming perfect splices, the ratio of the peaks should be 0.63. If the measured excess losses of 0.6 dB and 2.4 dB from the two couplers are also included in the calculation, the ratio should be 0.32. If the average splice loss is assumed to be approximately 0.25 dB, then the calculated ratio would exactly match the measured value of 0.27. Thus, the breadboard experiments confirmed the theory outlined above.

Figure 4:
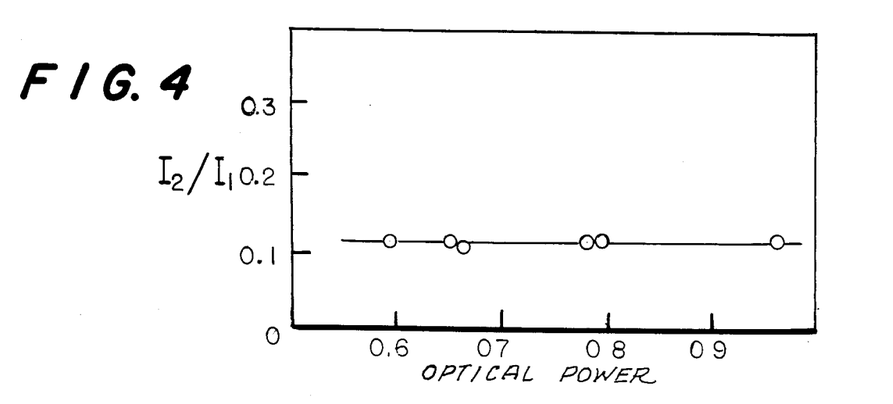
FIG. 4 is a graph depicting the output signal as a function of optical power variation of the FIG. 1 embodiment.

The breadboard sensor loop module was then subjected to power fluctuations in the optical source to replicate optical source drift. FIG. 4 depicts the results of such power fluctuation experiments. In FIG. 4, the X axis depicts fluctuation in the optical source from a theoretical output power of 1.0 L $L_o$. The Y axis depicts the output signal which corresponds to the ratio of the second peak intensity to the first peak intensity. As can be seen from FIG. 4, as the optical source power was fluctuated, the output signal remained very stable. In each case, the measured peak ratio remains essentially unchanged for variations at higher power levels and falls off only slightly at lower power levels. It is felt that the slight fall off at lower power levels is an artifact of signal digitization in the storage oscilloscope.

Figure 5:
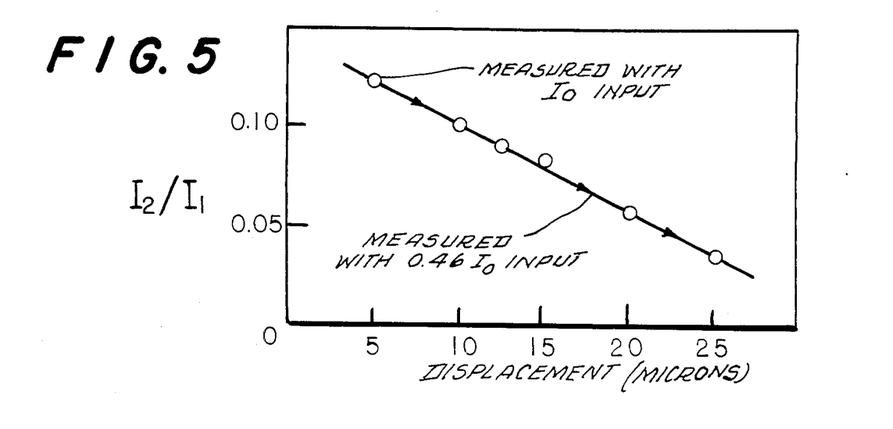
FIG. 5 is a graph depicting the output signal as it varies in accordance with a detected phenomenon according to the FIG. 1 embodiment.

A further test with the breadboard sensor module was carried out in which the optical transducer modulated the optical signal at two distinct input power levels. The data from this experiment is depicted in FIG. 5. In FIG. 5, the X axis depicts the displacement between the two cleaved ends of the fiber, while the Y axis depicts the ratio of the peak two to peak one light intensities. As can be seen, although the input peak power levels are different by more than a factor of 2, the peak ratios at both of those levels fall on the same curve. This indicates that the modulation encoded by the transducer was not significantly altered through the self-referencing multiplexing technique. Thus, an output signal which varies in accordance with the detected phenomenon remains relatively insensitive to optical source fluctuations.

Figure 3:
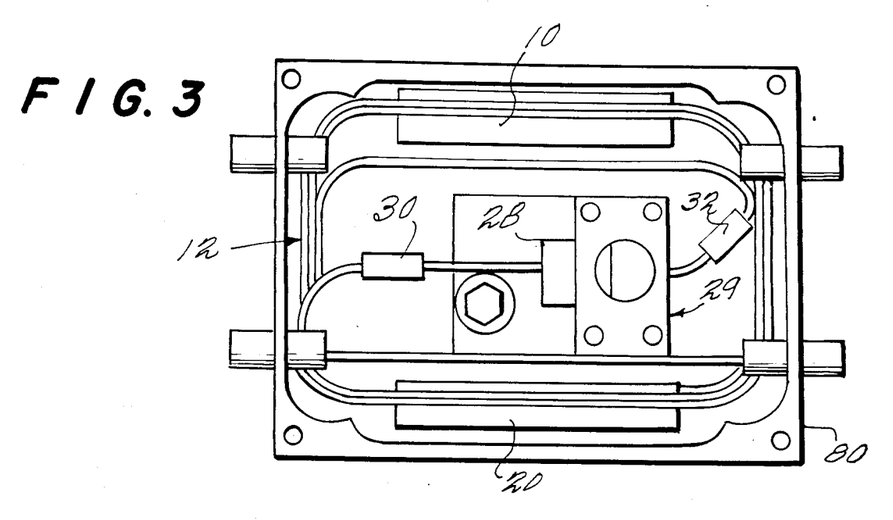
FIG. 3 is a plan view of an actual device according to the FIG. 1 embodiment.

After the breadboard sensor experiments, three sensor modules were fabricated using 9:1 multimode couplers from ADC Fiber Optics. A plan view of one of these sensor modules is depicted in FIG. 3. Shown in FIG. 3 are fiber optic coupler 10, optical loop 12, optical transducer 28, transducer housing 29, optical coupler 20, optical splices 30 and 32, and unit housing 80. As can be readily appreciated from FIG. 3, an optical transducer according to the present invention may be packaged in a very compact, light-weight configuration.

Three of the modules according to FIG. 3 where then assembled as depicted in FIG. 2. The entire system was then tested to confirm the functionality of the individual sensors and to analyze any crosstalk that might be seen. Finally, the measured performance of the third sensor module within the system was compared with its transducer calibration, which calibration was performed initially outside the system. These tests indicated that the module according to FIG. 3 provides a pulse train with first and second peak power intensities whose ratio corresponds to the phenomenon detected by the optical transducer.

Figure 6A:
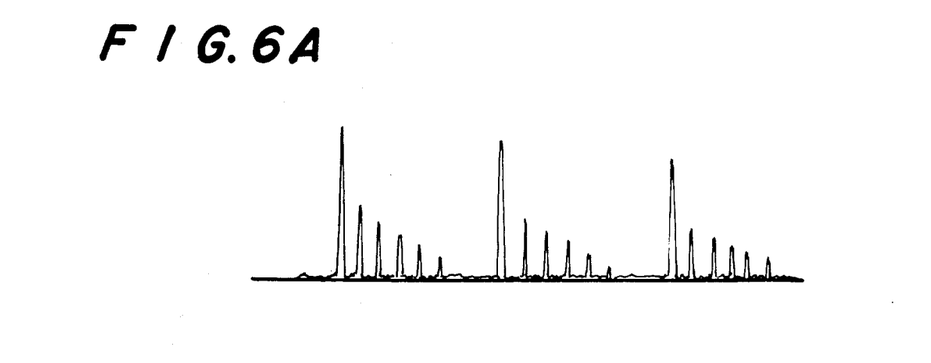
FIGS. 6a and 6b are graphs depicting unmodulated return signals and modulated return signals according to the FIG. 1 embodiment.
Figure 6B:
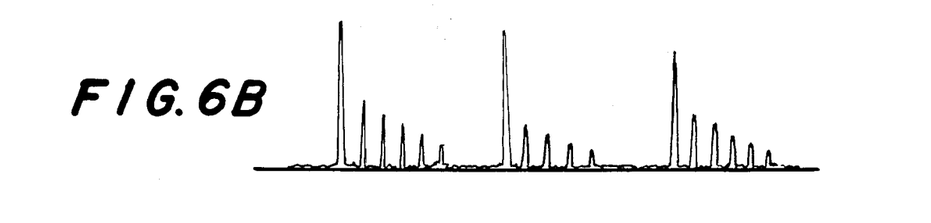

FIGS. 6a and 6b display the return optical pulse trains from the three-sensor prototype system. FIG. 6a shows the pulse trains in an unmodulated state. Conversely, FIG. 6b depicts a pulse train in which the first and third sensors are unmodulated while the second sensor is modulated. A close examination for the pulse trains of the second sensor in FIGS. 6a and 6b shows that the first peak is unchanged in both cases, but the subsequent pulses are definitely reduced for the modulated case. This clearly shows that the optical sensor according to FIG. 3 performs as theory predicts.

Figure 7:
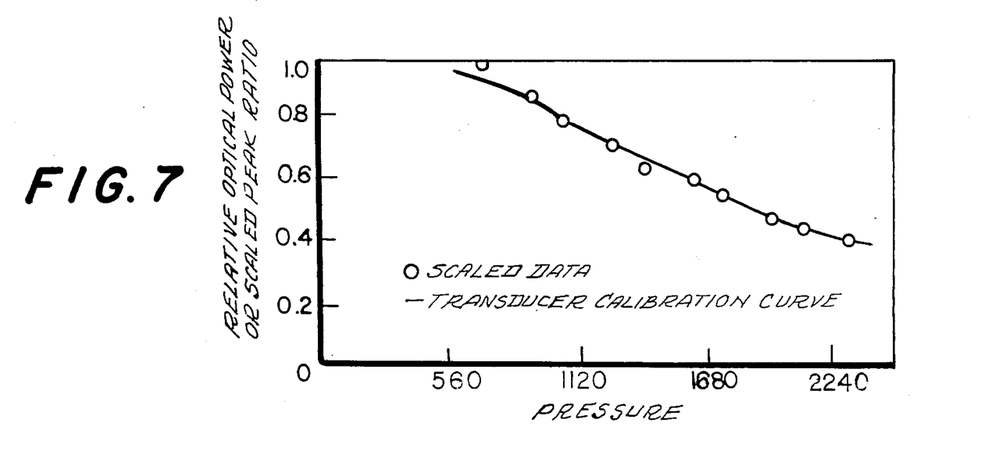
FIG. 7 is a graph which depicts a scaled output signal showing its variation with pressure applied to the optical transducer according to the FIG. 1 embodiment.

FIG. 7 shows data taken from the third sensor module depicted in FIG. 2. The X axis depicts the pressure applied to the photo transducer, while the Y axis depicts the relative optical power or the scaled peak ratio. The output signals were scaled to take into account excess optical losses and the splitting ratios of the optical couplers used, and compared with the calibration data taken before the transducer was integrated into the loop sensor. As can be seen in FIG. 7, the output signal definitely varies in accordance with the pressure applied to the optical transducer, and remains relatively insensitive to transmission losses and optical source drift.

As can be appreciated, the pulse trains depicted in FIG. 6 may be provided to processor 34 which time demultiplexes the signals and provides output signals corresponding to the ratios of the first and second peak power intensities in each pulse train. Such output signals then accurately reflect the phenomenon detected by each of the sensors.

Figures 8, 9:
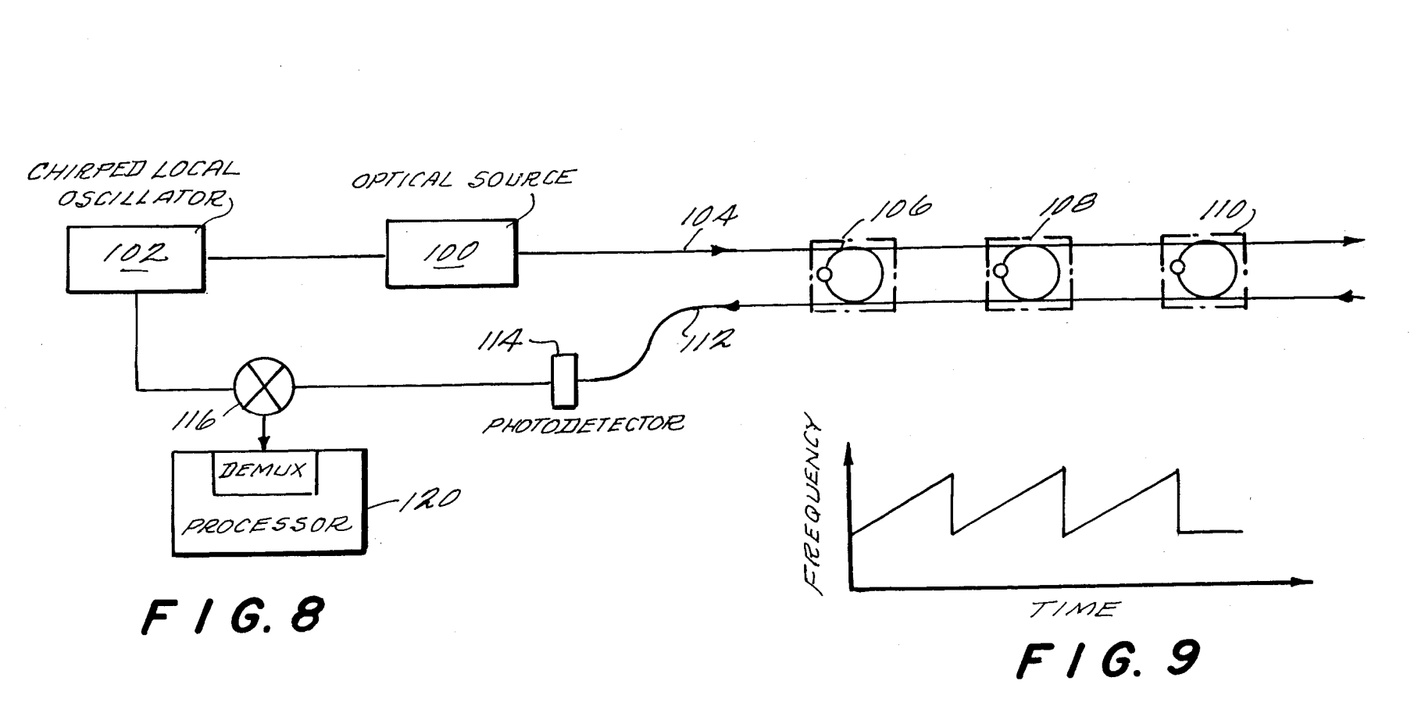
FIG. 8 is a schematic diagram of a three optical loop-transducer device according to the frequency multiplexed embodiment of the present invention.
FIG. 9 is a graph showing the form of the frequency chirped source light beam according to the FIG. 8 embodiment.

As an alternative to the time-multiplexing embodiment, a frequency-multiplexing embodiment may also be realized. FIG. 8 depicts such an apparatus. In FIG. 8, optical source 100 is frequency modulated by a local oscillator 102. In a preferred configuration, the frequency modulation is chirped modulation. Such chirped frequency modulation is depicted in FIG. 9. As shown in FIG. 9, the frequency modulation takes the form of a linear ramp, thus presenting a saw-tooth waveform. The signal at the input may be $f = f_0 + f_1 t$ where $f_0$ and $f_1$ are constants and t is time.

The chirped signal is provided from optical source 100 to transmission line 104. The chirped signal passes through sensors 106, 108, and 110. Each of these three sensors is constructed generally in accordance with the configuration described in FIGS. 1 and 2. The chirped signal in each sensor is thus split into a reference signal and a modulated signal. The reference and modulated signals are directed to photo detector 114 through transmission line 112. As can be appreciated, the signals received at photo detector 114 may be phase delayed with respect to the original signals.

The output of photo detector 114 is directed to mixer 116 where it is mixed with the original signal provided from oscillator 102. When these signals are mixed, a number of distinct frequency beat signals are produced. These frequency beat signals are analogous to the time division signals according to the embodiment of FIG. 1. However, the beat signals are now in the frequency domain and not in the time domain. Thus, in the three-sensor system depicted in FIG. 8, three pulse trains will be produced in the frequency domain. The relative intensities of the pulses within each pulse train thus provide a measure of the amplitude modulation of the signal by the transducer within each recirculating optical loop. The relative intensities are also insensitive to optical losses in the recirculating loops and degradation due to optical source drift.

Figure 10:
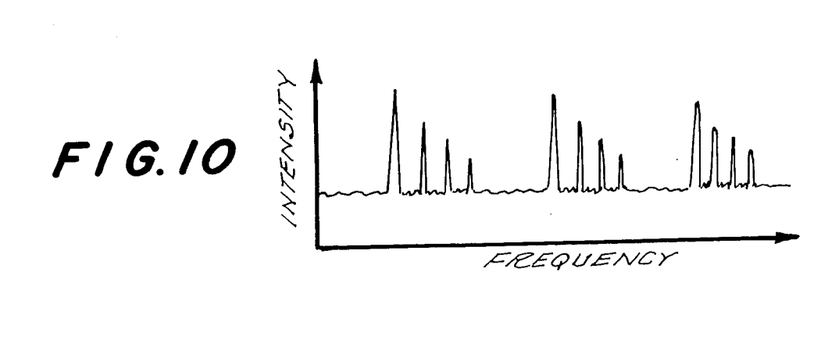
FIG. 10 is a graph depicting the photo detector pulse train according to the FIG. 8 embodiment.

FIG. 10 depicts the three pulse trains provided from mixer 116. Each pulse train includes a first spike which corresponds to the reference pulse. The second spike in each pulse train then corresponds to the modulated pulses. By forming a ratio between the reference pulse and the modulated pulse, output signals may be provided which vary in accordance with the detected phenomenon but are relatively insensitive to transmission losses and optical source drift.

As with the embodiment according to FIGS. 1 and 2, the frequency multiplexed embodiment of FIG. 8 may include a processor 120 which receives the pulse trains shown in FIG. 10 and provides output signals corresponding to the phenomena detected by sensors 106, 108, and 110.

While the present invention has been described with reference to time-multiplexing and frequency-multiplexing embodiments, those having ordinary skill in this field will understand that various other modifications may be made which would not depart from the teachings of this invention or the scope of protection afforded by the appended claims. All such equivalent structures are intended to be included within the scope of protection afforded to this invention.

Thus, what has been described is novel apparatus and method for self-referencing and multiplexing intensity modulating fiber optic transducers. The present invention allows determination of optical modulation at a number of locations independent of the number and quality of intervening optical connections up to the point where some accuracy/loss threshold is exceeded for the system. For presently available components, the number of transducers that could be combined into a system appears to be in the range of 5-10. However, it is to be understood that any number of transducers may be used depending on the components used and the application involved. In addition, the technique according to the present invention is compatible with any fiber optic sensor that produces intensity modulation. Thus, the present invention should not be limited to multi-mode fiber or sensors, and a number of interesting single mode applications of the same architecture will suggest themselves to persons of ordinary skill in the field. For example, resonance pumping may be used to determine round trip times in the system and hence strain induced fiber length changes in the recirculating loops. Those having skill in this field will understand that a wide variety of applications may be satisfied by the structure and method according to the presently claimed invention.

While the invention has been described in connection with what is presently considered to be the most practical and preferred embodiments, it is to be understood that this invention is not limited to the disclosed embodiments, but, on the contrary is intended to cover various modifications and equivalent arrangements included within the spirit and scope of the appended claims. Persons of ordinary skill in this field are to understand that all such equivalent structures and arrangements are to be included within the scope of the following claims.

I claim:

1. Optical apparatus, comprising:
   means for providing a source light beam;
   means for propagating said source light beam in a forward light channel;
   means for propagating said source light beam from said forward light channel into a first loop path, said first loop path having separate forward and return light beam paths;
   means for intensity modulating, in said first loop path, a first portion of said source light beam to provide a first modulated light beam;
   means for splitting off from said first loop path (a) a portion of said modulated light beam, and (b) a second portion of said source light beam which is unmodulated;
   means for propagating said portion of said modulated light beam and said second portion of said source light beam which is unmodulated in a return light channel;

means for detecting said portion of said modulated light beam and said second portion of said source light beam from said return light channel, and for providing first and second signals corresponding respectively thereto; and means for processing said first and second signals, and for providing an output signal corresponding to a ratio of said first and second signals.

2. Apparatus according to claim 1 wherein said means for propagating said source light beam from said forward light channel into a first loop includes:

a loop light channel comprising said forward and return paths and optically coupled to said forward light channel for directing light in said first loop path; and a first optical coupler, optically coupled to said loop light channel and said forward light channel, for directing at least a portion of said source light beam to said loop light channel.

3. Apparatus according to claim 2 wherein said means for splitting off includes a second optical coupler.

4. Apparatus according to claim 3 wherein said return light channel is optically coupled between said second optical coupler and said means for detecting.

5. Apparatus according to claim 4 wherein each of said loop light channel, said forward light channel, and said return light channel each includes a fiber optical cable.

6. Apparatus according to claim 1 further including:

means for propagating said source light beam in a second loop path;

means for modulating, in said second loop path, a third portion of said source light beam in accordance with an externally applied phenomenon to provide a second modulated light beam; and means for splitting off from said second loop path (a) a portion of said second modulated light beam, and (b) a fourth portion of said source light beam which is unmodulated;

and wherein said means for detecting detects said portion of said second modulated light beam and said fourth portion of said source light beam and provides third and fourth signals corresponding respectively thereto;

and wherein said means for processing receives said third and fourth signals and provides a second output signal corresponding to a ratio of said third and fourth signals.

7. Apparatus according to claim 6 further including:

frequency modulating means, coupled to said means for providing a source light beam, for frequency modulating said source light beam;

mixer means, coupled to said frequency modulating means and said means for detecting, for mixing together an output of said frequency modulating means and said first, second, third and fourth signals to provide first, second, third and fourth beat signals; and wherein said means for processing includes means for demultiplexing said first, second, third, and fourth beat signals to provide said first and second output signals.

8. Apparatus according to claim 7 wherein said frequency modulating means includes a chirped local oscillator.

9. Apparatus according to claim 6 wherein said means for providing a source light beam includes a pulsed light source, and wherein said means for processing includes means for time demultiplexing said first, second, third, and fourth signals to provide said first and second output signals.

10. Optical apparatus comprising:

means for providing a source optical pulse;

loop means for guiding said source optical pulse in a loop path, said loop path including separate forward and return light beam paths;

first fiber optic means for guiding said source optical pulse from said means for providing to said loop means;

modulating means, optically coupled to said loop means, for modulating said source optical pulse in accordance with an externally applied condition to provide a modulated optical pulse;

first coupling means, optically coupled to said loop means, for splitting off from said loop means a portion of said source optical pulse and a portion of said modulated optical pulse;

detecting means for sequentially detecting said portions, and for providing first and second sequential electrical signals correspond respectively to said portion of said source optical pulse and said portion of said modulated optical pulse;

processing means for receiving said first and second electrical signals and providing an output signal corresponding to a ratio of said first and second electrical signals; and wherein said loop means includes second coupling means for optically coupling at least a portion of said source optical pulse from said first fiber optic means to said loop means, and second fiber optic means disposed in a loop and coupled to said first and second coupling means, for carrying said source optical pulse in said forward and return paths.

11. Optical apparatus comprising:

means for providing an optical signal having a source optical pulse;

first light guiding means for guiding said source optical pulse;

first optical coupler means, optically coupled to said first light guiding means, for splitting off at least a portion of said source optical pulse;

second light guiding means, having first and second ends, said first end being optically coupled to said first optical coupler means, for guiding said portion;

third light guiding means, having a first end optically coupled to said second light guiding means second end, and a second end optically coupled to said second light guiding means first end through said first optical coupler means, for guiding at least said portion of said source optical pulse;

modulation means optically coupled to said third light guiding means between said third light guiding means first and second ends, adapted for detecting an externally applied condition, and for modulating said portion of said source optical pulse in accordance with said externally applied condition to provide a modulated pulse to said second light guiding means;

second optical coupler means, optically coupled to said second light guiding means second end and said third light guiding means first end, for sequentially splitting off (a) a part of said portion of said source optical pulse, and (b) a part of said modulated pulse;

fourth light guiding means, optically coupled to said second optical coupler means, for guiding the split off parts;

photodetector means for (a) receiving said split off parts from said fourth light guiding means, (b) sequentially detecting light intensities of said parts, and (c) providing first and second electrical signals corresponding respective to the detected light intensities of said parts; and processing means for receiving said first and second electrical signals and providing an output signal corresponding to a ratio of said first and second electrical signals.

12. Apparatus according to claim 11 wherein said first, second, third, and fourth light guiding means each comprise a fiber optic cable.

13. Apparatus according to claim 11 wherein said modulation means comprises an optical transducer which modulates a light intensity of said portion of said source optical pulse.

14. Optical apparatus, comprising;

optical source means for providing a pulsed source light beam;

first light channel means for directing said source light beam;

light channel loop means for carrying light in a loop path, said loop means having a forward propagation path and a return propagation path;

first optical coupler means for receiving said pulsed source light beam and directing a portion of it to said forward path of said loop means;

optical transducer means, coupled to said return path of said loop means, for modulatng said portion in accordance with an externally applied condition, said transducer means providing a modulated light beam to said first coupler means which directs it to said loop means forward path;

second light channel means for carrying light;

second optical coupler means coupled between said loop means forward and return paths, for (a) receiving said portion of said pulsed source light beam from said forward path and directing a part of it to said second light channel means, (b) directing remaining parts of said portion of said pulsed source light beam to said return path, and (c) receiving said modulated light beam from said forward path and directing a part of it to said second light channel means;

photodetector means for receiving said part of said portion of said pulsed source light beam and said part of said modulated light beam, and for providing respective first and second electrical signals corresponding thereto; and processing means for receiving said first and second electrical signals from said photodetector means, and for providing an output signal corresponding to a ratio of said first and second electrical signals.

15. An optical sensing method comprising the steps of:

providing a source light beam;

propagating said source light beam in a first loop path comprising separate forward and return light beam paths;

splitting off a first portion of said source light beam from said first loop path, wherein said step of splitting of said first portion includes the step of splitting off said portion of said source light beam after said source light beam has propagated through said forward path but before said source light beam has entered said return path;

modulating, in said first loop path, a second portion of said source light beam in accordance with an externally applied condition to provide a modulated light beam propagating in said first loop path, said modulating step including the step of modulating said second portion of said source light beam in said return path;

splitting off a portion of said modulated light beam from said first loop path, said step of splitting off said portion of said modulated light beam including the step of splitting off said portion after said modulated light beam has been propagated from said return path to said forward path;

detecting said split off first portion of said source light beam and said split off portion of said modulated light beam, and providing first and second signals corresponding respectively thereto; and processing said first and second signals to provide a first output signal corresponding to a ratio of said first and second signals.

16. A method according to claim 15 including the further steps of:

propagating said source light beam in a second loop path;

splitting of a third portion of said source light beam from said second loop path;

modulating, in said second loop path, a fourth portion of said source light beam in accordance with an externally applied phenomenon to provide a second modulated light beam propagating in said second loop path;

splitting off a portion of said second modulated light beam from said second loop path;

and wherein said detecting step includes the step of detecting said split off third portion of said source light beam and said split off portion of said second modulated light beam, and providing third and fourth signals corresponding respectively thereto;

and wherein said processing step includes the step of processing said third and fourth signals to provide a second output signal corresponding to a ratio of said third and fourth signals.

17. A method according to claim 16 wherein said step of providing a source light beam includes the steps of:

providing a frequency modulated signal; and frequency modulating said source light beam in accordance with said frequency modulated signal.

18. A method according to claim 17 wherein said processing step includes the steps of:

mixing said first, second, third, and fourth signals with said frequency modulated signal to provide first, second, third, and fourth beat signals; and demultiplexing said first, second, third, and fourth beat signals to provide said first and second output signals.

19. A method according to claim 16 wherein said step of providing a source light beam includes the step of providing a pulsed source light beam, and wherein said processing step includes the step of time demultiplexing said first, second, third and fourth signals to provide said first output signal and said second output signal.

20. A method according to claim 15 wherein said step of propagating includes the step of propagating said source light beam in a fiber optic loop path.

21. An optical sensing method comprising the steps of:

providing, from a light source, a source optical pulse;

guiding said source optical pulse in a forward light channel;

guiding said source optical pulse from said forward light channel into a loop path having separate forward and return light beam paths;

splitting off from said loop path a portion of said source optical pulse;

modulating in said loop path, non-split-off portions of said source optical pulse in accordance with an externally applied condition to provide a modulated pulse to said loop path;

splitting off from said loop path a portion of said modulated pulse;

guiding said portion of said modulated pulse and said source optical pulse into a return light channel;

detecting the split off portions of said source optical pulse and said modulated pulse from said return light channel, and providing first and second signals corresponding to light intensities of the detected portions; and processing said first and second signals to provide an output signal corresponding to a ratio of said first and second signals.

* * * * *

UNITED STATES PATENT AND TRADEMARK OFFICE
CERTIFICATE OF CORRECTION

PATENT NO. : 4,777,661
DATED : October 11, 1988
INVENTOR(S) : William B. Spillman, Jr.

It is certified that error appears in the above-identified patent and that said Letters Patent is hereby corrected as shown below:

Column 4, line 15;

"portionn"    should read    --portion-- .

Column 8, line 8;

"1.0 L I"    should read    --1.0 I-- .

Signed and Sealed this

Twenty-eighth Day of March, 1989

*Attest:*

DONALD J. QUIGG

*Attesting Officer*    *Commissioner of Patents and Trademarks*